United States Patent [19]
Breen

[11] Patent Number: 5,312,168
[45] Date of Patent: May 17, 1994

[54] METHOD AND APPARATUS FOR EQUALIZING VEHICLE BRAKE WEAR

[75] Inventor: Michael T. Breen, Garden City, Mich.

[73] Assignee: Eaton Corporation, Cleveland, Ohio

[21] Appl. No.: 114,761

[22] Filed: Aug. 31, 1993

[51] Int. Cl.$^5$ .................. B60T 13/68; B60T 10/00; B60T 13/00

[52] U.S. Cl. ................... 303/9.61; 188/3 R; 188/181 T; 188/106 P; 188/181 C; 303/3; 303/7; 303/20; 303/100; 303/6.01; 303/93

[58] Field of Search ............... 188/181 T, 3 R, 106 P, 188/158, 349, 71.1, 181 C; 303/112, 93, 101, 2-3, 6.01, 7-8, 9.61, 15, 20, 13, 91, 9.62, 100, 102, 949.66, 95, 98, 103, 105, 106, 107, 109, 113.4, DIG. 2, DIG. 3, DIG. 4, 111

[56] References Cited

U.S. PATENT DOCUMENTS

| 4,404,234 | 2/1989 | Gee et al. |
| 4,768,840 | 9/1988 | Sullivan et al. |
| 4,804,237 | 2/1989 | Gee et al. |
| 5,172,960 | 12/1992 | Chareire ............... 303/9.61 |

Primary Examiner—Douglas C. Butler
Attorney, Agent, or Firm—Brooks & Kushman

[57] ABSTRACT

Brake wear between braking sites of a vehicle is equalized by measuring work performed at the braking sites, comparing the amount of work performed at each braking site with an average calculated for all braking sites, and increasing braking demand at any braking site performing less than the average amount of work.

9 Claims, 2 Drawing Sheets

METHOD AND APPARATUS FOR EQUALIZING VEHICLE BRAKE WEAR

TECHNICAL FIELD

This invention relates to centrally controlled fluid-pressure braking apparatus and methods for equalizing vehicle brake wear.

BACKGROUND INFORMATION

Braking control systems are well known in the prior art and have been designed for vehicles from small passenger vehicles to large trucks. A frequent object of such systems is to optimize braking effectiveness and vehicle control. Another object is to control the braking effort contributed by each braking site to provide balanced and proportional braking. Such systems find particularly useful application on large, articulated trucks. Control systems for proportionally distributing braking effort include systems operated as a function of vehicle acceleration and various forces and as a function of vehicle driver demand.

Typical of the latter type of control systems are those disclosed by U.S. Pat. Nos. 4,768,840; 4,804,234; and 4,804,237 to Gee and Sullivan. The first cited patent discloses a vehicle braking control system that senses the magnitude of driver demand for braking effort and causes each of the braking sites to exert a braking force that is dependent on the value of the demand and independent of load under conditions of relatively low braking effort demand and causes each of the braking sites to exert a braking force that is directly related to the value of the demand and to the load at the braking site under conditions of relatively high braking effort demand.

The second cited U.S. Pat. No. 4,804,234 discloses a vehicle braking control system that senses the magnitude of driver demand for braking effort, that determines the ratio of the horizontal to vertical force at the fifth wheel/king pin connection of the vehicle, and that senses vehicle acceleration. The braking control system, when the vehicle is under conditions of relatively low braking effort demand, causes each of the braking sites to exert a braking force that is dependent on the value of the demand and independent of load. When the vehicle is under conditions of relatively high braking effort demand, the braking control system causes each of the braking sites to exert a braking force that is directly related to the vehicle acceleration, to the value of the demand, and to the load at the braking site.

The third cited U.S. Pat. No. 4,804,237 discloses a vehicle braking control system that senses the amounts of horizontal and vertical forces at the fifth wheel/king pin connection of the vehicle, that senses vehicle acceleration, and that senses the magnitude of driver demand for braking effort. The trailer mass is estimated from sensed values of horizontal forces acting at the fifth wheel/king pin connection of the vehicle during non-braking acceleration, and the force applied to each trailer brake is sensed and compared with reference levels to estimate an average characteristic for the trailer brakes, If driver demand is less than a reference level, tractor and trailer brakes are applied such that the average value of a selected parameter indicative of trailer brake wear is related in a predetermined manner to the average value of the parameter indicative of tractor brake wear.

While each of these braking systems functions with a certain degree of efficiency, none discloses the advantages of the method and apparatus for equalizing the brake wear of a braking vehicle of the present invention as is hereinafter more fully described.

DISCLOSURE OF THE INVENTION

An object of the present invention is to provide an improved method and apparatus for equalizing brake wear between braking sites of a vehicle by comparing the amount of work done by each braking site with a reference work amount and increasing the braking effort of any site performing work below the reference work amount.

An advantage attending the present invention is that balancing the amount of work performed at each braking site results in increased braking effectiveness.

In realizing the aforementioned and other objects and advantages, a preferred embodiment of the present invention includes a brake treadle sensor that determines displacement of a brake treadle, the displacement being related to driver demand and the amount of pressure applied to vehicle brakes. A torque calculator for each braking site determines, for each of the braking sites, and as a function of driver demand and brake radius, torque applied to the braked wheels.

A total torque calculator sums the torques of each braking site, and a force calculator determines the total force being exerted to decelerate the vehicle as a function of the total torque and brake radius. A deceleration calculator determines vehicle deceleration as a function of the mass of the vehicle and the total force being exerted. A current wheel velocity calculator determines current wheel velocity as a function of deceleration and time. A wheel velocity comparator compares the current wheel velocity with a value of initial wheel velocity to determine the existence of any difference between current and initial wheel velocities.

A work calculator for each braking site determines the amount of work performed at each of the plurality of braking sites as a function of the torque developed at the site, the difference between current and initial wheel velocities and time. A reference work amount calculator determines the average work performed per braking site as a function of the sum of the work performed at each braking site and the number of sites.

A work comparator for each braking site compares the level of work performed at the site with the average work performed per braking site to determine the existence of any difference. A driver demand controller for each braking site increases the value of the driver demand signal applied to a particular braking site if work performed at that site is less than the average amount of work performed per braking site. If the work being done at that braking site equals or exceeds the average amount of work performed per braking site, the value of the driver demand signal applied to that braking site is not modified.

The objects and advantages of the present invention are readily apparent from the following detailed description of the best mode for carrying out the invention when taken in connection with the accompanying drawing.

BRIEF DESCRIPTION OF THE DRAWING

A more complete appreciation of the invention and many of the attendant advantages thereof may be readily attained by reference to the following detailed description when considered with the accompanying drawings in which like reference characters indicate corresponding parts in all the views, wherein.

BEST MODE FOR CARRYING OUT THE INVENTION

It is known that there is a relationship between work done by a brake and brake wear. The present invention equalizes brake wear by measuring work performed at vehicle braking sites, comparing the amount of work performed at each braking site with an average calculated for all braking sites, and increasing braking demand at any braking site performing less than the average amount of work.

Figure 1:
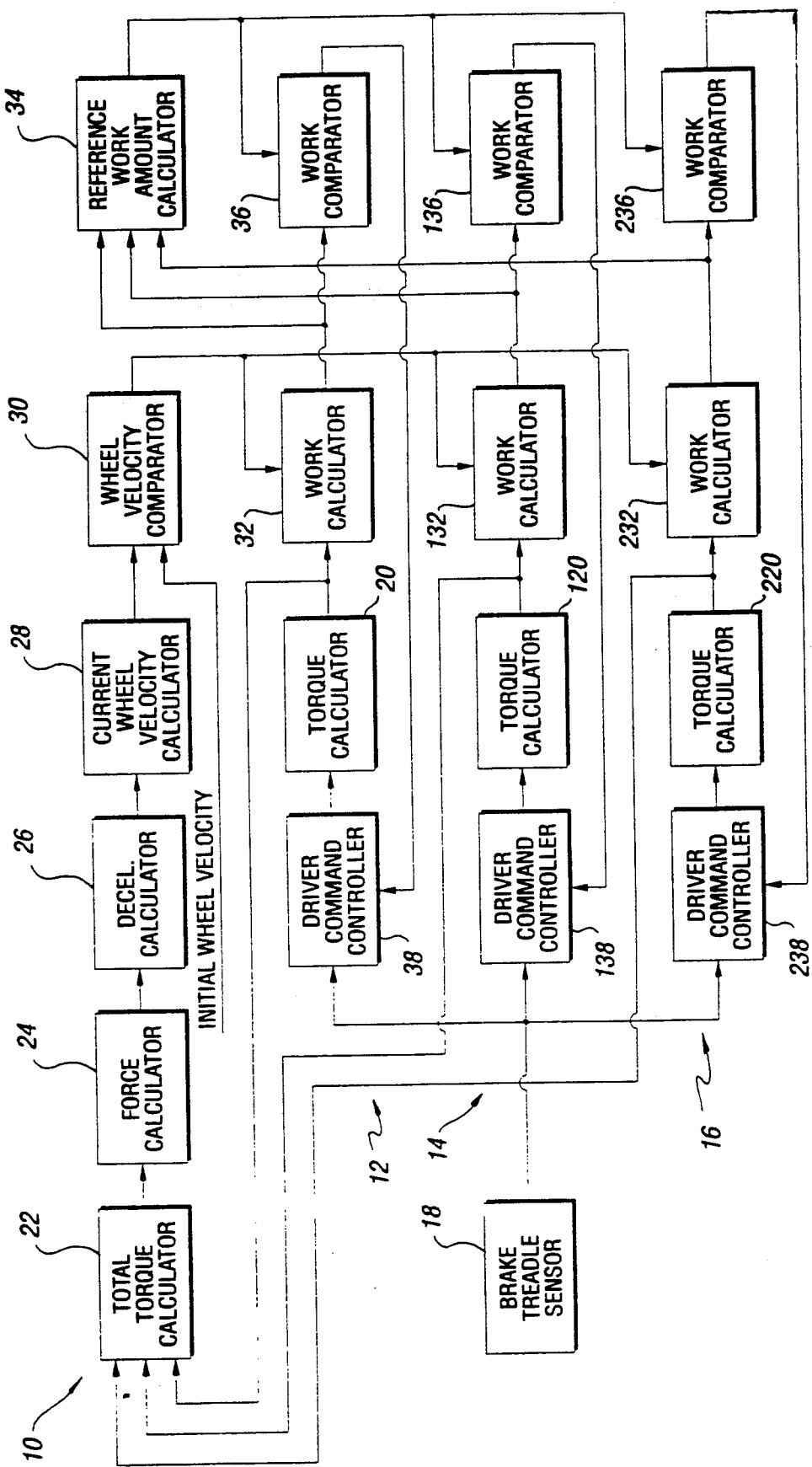
FIG. 1 is a schematic illustration of the apparatus for equalizing vehicle brake wear.

FIG. 1 of the drawing is a schematic illustration showing the major elements of the apparatus, generally indicated by reference numeral 10, for equalizing vehicle brake wear by equalizing the amount of work done at all of a number of braking sites. Although the illustration represents the apparatus of the present invention as being a pneumatic braking system having three braking sites, namely, a steer axle braking site, a drive axle braking site and a trailer braking site, it should be understood that the concept is readily applicable to other vehicle braking systems having a greater or lesser number of braking sites.

A vehicle in which the present invention is installed is assumed to be of known mass. It includes a brake treadle, and each of its braking sites has a plurality of braked wheels of known brake radius disposed on at least one axle. Elements associated with the steer axle, drive axle and trailer braking sites are generally indicated by reference numerals 12, 14 and 16 respectively.

A preferred embodiment of the apparatus includes a brake treadle sensor 18 that determines displacement of the brake treadle and generates a driver demand signal representative of the brake treadle displacement, the displacement being related to driver demand and the amount of pressure applied to vehicle brakes. A torque calculator 20, 120 and 220 for each braking site receives the driver demand signal from the brake treadle sensor 18 and determines the amount of torque applied to the braked wheels for each of the braking sites as a function of driver demand and brake radius. Each torque calculator 20, 120 and 220 generates a torque-per-site signal representative of the torque applied to the braked wheels at its respective braking site.

The torque-per-site signals from all the braking sites are received by a total torque calculator 22, which sums the braking site torques. The total torque calculator 22 generates a total torque signal representative of the sum of the braking site torques. A force calculator 24 receives the total torque signal and determines the total force being exerted to decelerate the vehicle as a function of the total torque and brake radius. The force calculator 24 generates a deceleration force signal representative of the total deceleration force being exerted.

A deceleration calculator 26 receives the deceleration force signal and determines vehicle deceleration as a function of the mass of the vehicle and the total force being exerted. The deceleration calculator 26 generates a deceleration signal representative of the vehicle deceleration. The deceleration signal is received by a current wheel velocity calculator 28. The latter determines current wheel velocity as a function of deceleration and time and generates a current wheel velocity signal representative of the determined current wheel velocity.

A wheel velocity comparator 30 receives the current wheel velocity signal, compares it with a value of initial wheel velocity, and generates a wheel velocity signal representative of any difference between current and initial wheel velocities. A work calculator 32, 132 and 232 for each braking site receives the torque-per-site signal and the wheel velocity signal and determines the amount of work performed at each of the plurality of braking sites for each of the braking sites as a function of the torque-per-site, wheel velocity and time. The work calculator 32, 132 and 232 generates a work-per-site signal representative of the work performed at each of the braking sites.

The work-per-site signals from all the braking sites are received by a reference work amount calculator 34, which determines as a function of the sum of the work performed at each braking site and the number of sites, the average work performed per braking site. The reference work amount calculator 34 generates a reference work amount signal representative of the average work performed per braking site.

A work comparator 36, 136 and 236 for each braking site receives the work-per-site signal and the reference work amount signal, compares the signals, and generates an error signal representative of any difference between work being performed per braking site and the average amount of work performed per braking site.

A driver demand controller 38, 138 and 238 for each braking site receives the driver demand signal and the error signal and increases the value of the driver demand signal applied to a particular braking site if work performed at that site is less than the average amount of work performed per braking site. If the work being done at that braking site equals or exceeds the average amount of work performed per braking site, the value of the driver demand signal applied to that braking site is not modified.

As previously mentioned, elements associated with the steer axle, drive axle and trailer braking sites are generally indicated by reference numerals 12, 14 and 16 respectively. For convenience and clarity, the reference numerals of individual elements in the steer axle, drive axle and trailer braking sites have been assigned similar reference numerals. The numbers assigned to elements in one braking site differ from numbers of elements in another braking site by multiples of one hundred. For example, the driver demand controllers of the steer axle braking site 12, the drive axle braking site 14 and the trailer braking site 16 have been assigned the reference numerals 38, 138 and 238 respectively.

Figure 2:
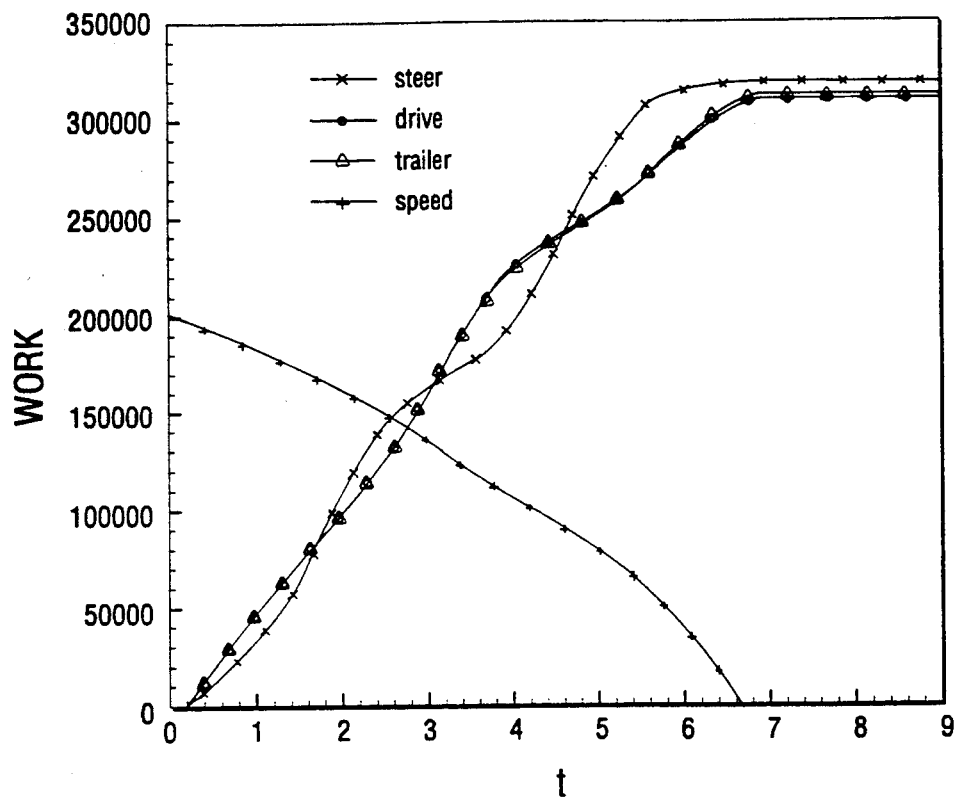
FIG. 2 is a graphic illustration of work performed at individual braking sites in the work-balanced braking system of the present invention.

FIG. 2 of the drawing illustrates, for a work-balanced braking system, the amount of work performed at the steer axle braking site, at the drive axle braking site and at the trailer braking site as brakes are applied and vehicle velocity diminishes. The vertical axis of the graph represents work and vehicle velocity, and the horizontal axis represents time.

Figure 3:
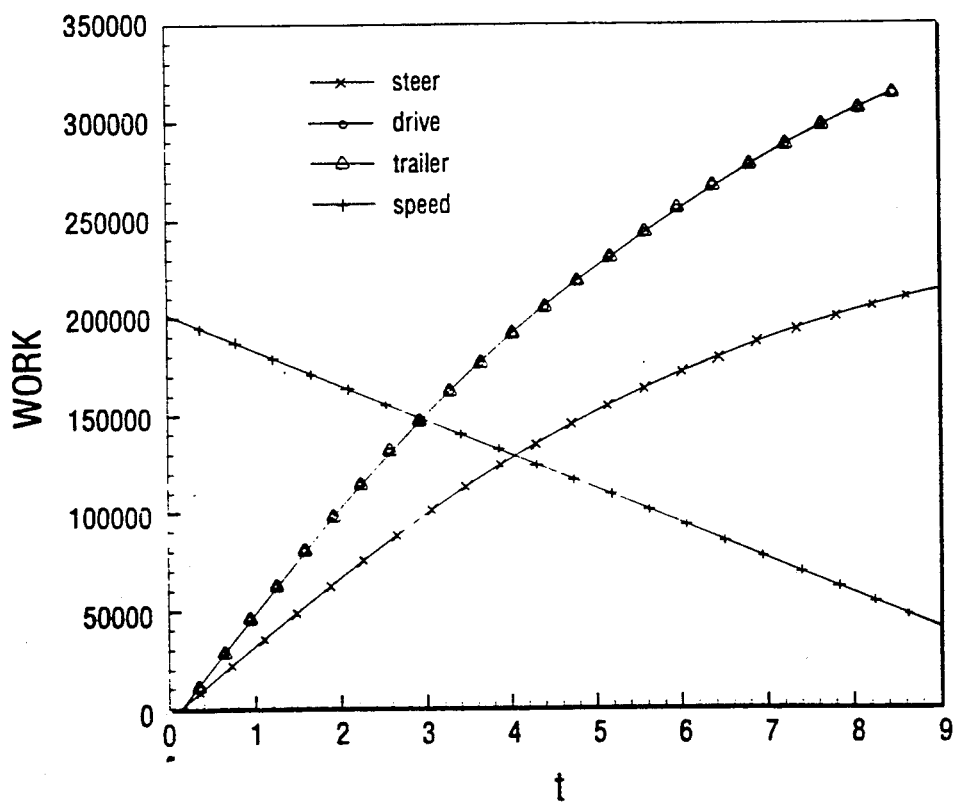
FIG. 3 is a graphic illustration of work performed at individual braking sites in an unbalanced braking system.

FIG. 3 of the drawing illustrates, for an unbalanced braking system, the amount of work performed at the steer axle braking site, the drive axle braking site and the trailer braking site as brakes are applied and vehicle velocity diminishes. As can be seen from a comparison of FIGS. 2 and 3, the work performed at the steer braking site of the unbalanced braking system falls progressively below that performed at the work-balanced braking site. As also shown, in addition to causing uneven brake wear, the unbalanced braking system decelerates a vehicle at a significantly slower rate than does the work-balanced braking system.

While the best mode for carrying out the invention has been described in detail, those familiar with the art to which this invention relates will recognize that a braking system could differ from that just described, for example, the braking system could be hydraulic rather than pneumatic and the number of braking sites could be greater or lesser, without departing from the spirit and scope of the invention as hereinafter claimed.

What is claimed is:

1. An apparatus for equalizing brake wear between braking sites of a vehicle, the vehicle having a brake treadle and a plurality of braking sites, each braking site having a plurality of braked wheels of known brake radius disposed on at least one axle, the apparatus comprising:

brake treadle sensing means for determining brake treadle displacement and for generating a driver demand signal representative of the brake treadle displacement;

torque calculating means for each of the plurality of braking sites for calculating, as a function of the brake treadle displacement represented by the driver demand signal and of the brake radius, torque applied to the at least one axle at each of the plurality of braking sites and for generating a torque-per-site signal representative of the torque applied to the at least one axle;

work calculating means for each of the plurality of braking sites for calculating, as a function of braking site torque represented by the torque-per-site signal, of wheel velocity and of time, the amount of work performed at each of the plurality of braking sites and for generating a work-per-site signal representative thereof;

work comparing means for each of the plurality of braking sites for comparing the work-per-site signal with a reference work signal and for generating an error signal representative of any difference therebetween; and controlling means for each of the plurality of braking sites for modifying the driver demand signal to increase the work done by a braking site if the amount of work performed at that site is less than the amount of work represented by the reference work signal.

2. The apparatus as defined by claim 1, further comprising reference work amount calculating means for receiving each of the work-per-site signals, for calculating therefrom the average amount of work performed at each braking site, and for generating the reference work signal representative of the average amount of work performed at each braking site.

3. The apparatus as defined by claim 2, wherein the vehicle has a known mass, the apparatus further comprising:

total torque calculating means for receiving each of the torque-per-site signals, for summing braking site torques represented thereby, and for generating a total torque signal representative of the sum of the braking site torques;

force calculating means for receiving the total torque signal, for calculating the total force being exerted to decelerate the vehicle as a function of the total torque represented by the total torque signal and of the brake radius, and for generating a deceleration force signal representative of the total deceleration force being exerted;

deceleration calculating means for receiving the deceleration force signal, for calculating vehicle deceleration as a function of the total force represented by the deceleration force signal and of the mass of the vehicle, and for generating a deceleration signal representative of the vehicle deceleration;

current wheel velocity calculating means for receiving the deceleration signal, for calculating current wheel velocity as a function of deceleration and time, and for generating a current wheel velocity signal representative of the determined current wheel velocity; and wheel velocity comparing means for receiving the current wheel velocity signal, for comparing the current wheel velocity with initial wheel velocity, and for generating a wheel velocity signal representative of any difference between current and initial wheel velocities for communication to each of the work calculating means.

4. A method for equalizing brake wear between braking sites of a vehicle, the vehicle having a brake treadle and a plurality of braking sites, each braking site having a plurality of braked wheels of known brake radius disposed on at least one axle, the method comprising the steps of:

sensing brake treadle displacement;

generating a driver demand signal representative of the brake treadle displacement;

calculating, for each of the plurality of braking sites and as a function of the brake treadle displacement represented by the driver demand signal and of the brake radius, torque applied to the at least one axle at each of the plurality of braking sites;

generating a torque-per-site signal representative of the torque applied to the at least one axle;

calculating, for each of the plurality of braking sites and as a function of braking site torque represented by the torque-per-site signal, of wheel velocity and of time, the amount of work performed at each of the plurality of braking sites;

generating a work-per-site signal representative of the work performed at each of the plurality of braking sites;

comparing, for each of the plurality of braking sites, the work-per-site signal with a reference work signal;

generating an error signal representative of any difference between the work-per-site signal and the reference work signal; and modifying the driver demand signal communicated to each of the plurality of braking sites to increase the work done by a braking site if the amount of work performed at that site is less than the amount of work represented by the reference work signal.

5. The method as defined by claim 4, wherein the step of comparing, for each of the plurality of braking sites, the work-per-site signal with a reference work signal is preceded by the further steps of:

determining, from all the work-per-site signals, the average amount of work represented thereby; and generating a reference work signal representative of the average amount of work performed at each braking site.

6. The method as defined by claim 5, wherein the vehicle has a known mass and wherein the wheel velocity signal is determined by the further steps of:

calculating the total torque by summing braking site torques represented by the torque-per-site signals from all the braking sites;

generating a total torque signal representative of the sum of the braking site torques;

calculating, as a function of the total torque represented by the total torque signal and of the brake radius, the total force being exerted to decelerate the vehicle;

generating a deceleration force signal representative of the total deceleration force being exerted;

calculating, as a function of the total force represented by the deceleration force signal and of the mass of the vehicle, vehicle deceleration;

generating a deceleration signal representative of the vehicle deceleration;

calculating, as a function of deceleration and of time, current wheel velocity;

generating a current wheel velocity signal representative of the determined current wheel velocity;

comparing the current wheel velocity with initial wheel velocity; and generating a wheel velocity signal representative of any difference between current and initial wheel velocities.

7. A system for equalizing brake wear between braking sites of a vehicle, the vehicle having a brake treadle and a plurality of braking sites, each braking site having a plurality of braked wheels of known brake radius disposed on at least one axle, the method comprising the steps of:

means for sensing brake treadle displacement;

means for generating a driver demand signal representative of the brake treadle displacement;

means for calculating, for each of the plurality of braking sites and as a function of the brake treadle displacement represented by the driver demand signal and of the brake radius, torque applied to the at least one axle at each of the plurality of braking sites;

means for generating a torque-per-site signal representative of the torque applied to the at least one axle;

means for calculating, for each of the plurality of braking sites and as a function of braking site torque represented by the torque-per-site signal, of wheel velocity and of time, the amount of work performed at each of the plurality of braking sites;

means for generating a work-per-site signal representative of the work performed at each of the plurality of braking sites;

means for comparing, for each of the plurality of braking sites, the work-per-site signal with a reference work signal;

means for generating an error signal representative of any difference between the work-per-site signal and the reference work signal; and means for modifying the driver demand signal communicated to each of the plurality of braking sites to increase the work done by a braking site if the amount of work performed at that site is less than the amount of work represented by the reference work signal.

8. The system as defined by claim 7, wherein the means for calculating the average amount of work performed at each braking site further includes:

means for determining, from all the work-per-site signals, the average amount of work represented thereby; and means for generating a reference work signal representative of the average amount of work performed at each braking site.

9. The method as defined by claim 8, wherein the vehicle has a known mass and wherein the wheel velocity signal is determined by the further steps of:

means for calculating the total torque by summing braking site torques represented by the torque-per-site signals from all the braking sites;

means for generating a total torque signal representative of the sum of the braking site torques;

means for calculating, as a function of the total torque represented by the total torque signal and of the brake radius, the total force being exerted to decelerate the vehicle;

means for generating a deceleration force signal representative of the total deceleration force being exerted;

means for calculating, as a function of the total force represented by the deceleration force signal and of the mass of the vehicle, vehicle deceleration;

means for generating a deceleration signal representative of the vehicle deceleration;

means for calculating, as a function of deceleration and of time, current wheel velocity;

means for generating a current wheel velocity signal representative of the determined current wheel velocity;

means for comparing the current wheel velocity with initial wheel velocity; and means for generating a wheel velocity signal representative of any difference between current and initial wheel velocities.

* * * * *